United States Patent [19]
Montgomery

[11] Patent Number: 5,105,766
[45] Date of Patent: Apr. 21, 1992

[54] BUCK BUCKET

[76] Inventor: Calvin W. Montgomery, 4 Baynard Cove Rd., Hilton Head, S.C. 29928

[21] Appl. No.: 692,926

[22] Filed: Apr. 29, 1991

[51] Int. Cl.$^5$ .............................................. A01K 5/00
[52] U.S. Cl. ................... 119/57.91; 119/51.01
[58] Field of Search ............... 119/51.01, 52.1, 57.91, 119/51.04, 56.1

[56] References Cited
U.S. PATENT DOCUMENTS 2,972,334  2/1961  Braden ........................ 119/51.01
3,515,098  6/1970  Thurmond .................... 119/51.01
3,677,230  7/1972  Braden ........................ 119/57.91
3,780,701  12/1973  Wentworth ................. 119/51.01

Primary Examiner—John G. Weiss
Attorney, Agent, or Firm—B. Craig Killough

[57] ABSTRACT

A container which may be hung or suspended dispenses feed through an aperture therein upon contact by an animal with a feeder rod extending below the container. The flow of feed from the container is regulated by a flow adjustment means which controls the dispensation of the feed from the container by means of an interaction with the feeder rod.

4 Claims, 2 Drawing Sheets

BUCK BUCKET

BACKGROUND OF THE INVENTION

The invention relates to feeding devices generally, and is more specifically directed to an animal feeder which may be hung or suspended, and which dispenses feed, such as corn, upon the animal's contact with a feeder rod extending from the device.

Numerous devices are known for feeding animals. The primary application of the present invention may be the feeding of wild animals, such as deer, however, any animal which is capable of making contact with the feeder rod so as to cause feed to be dispensed from the feeder container, can feed from the device.

SUMMARY OF THE INVENTION

The present invention comprises a container into which a feed material is place. A feeder rod is suspended within the bucket, and passes through an open aperture which is formed on a lower portion, such as the bottom, of the container to allow the feed to be gravity fed. As contact is made with the feeder rod, the feed within the container is agitated, and is dispensed through the open aperture. A flow adjustment means is positioned along the feeder rod, and variably engages the open aperture according to the position of the feeder rod to regulate the amount of feed which is dispensed from the device as contact is made with the feeder rod.

The device is designed to be hung or suspended, with the feeder rod extending well below the bottom of the container. By using a feeder rod which is semi-rigid, that is, capable of being manually formed yet retaining its shape upon formation, the device may be hung on the side of a tree, for example, with the feeder rod formed away from the tree as desired to avoid contact of the feeder rod with the tree. The device may be used to feed any animal which is capable of making contact with the feeder rod to cause feed to be dispensed from the container.

DETAILED DESCRIPTION OF THE DRAWINGS

DETAILED DESCRIPTION OF THE PREFERRED EMBODIMENT

Figure 1:
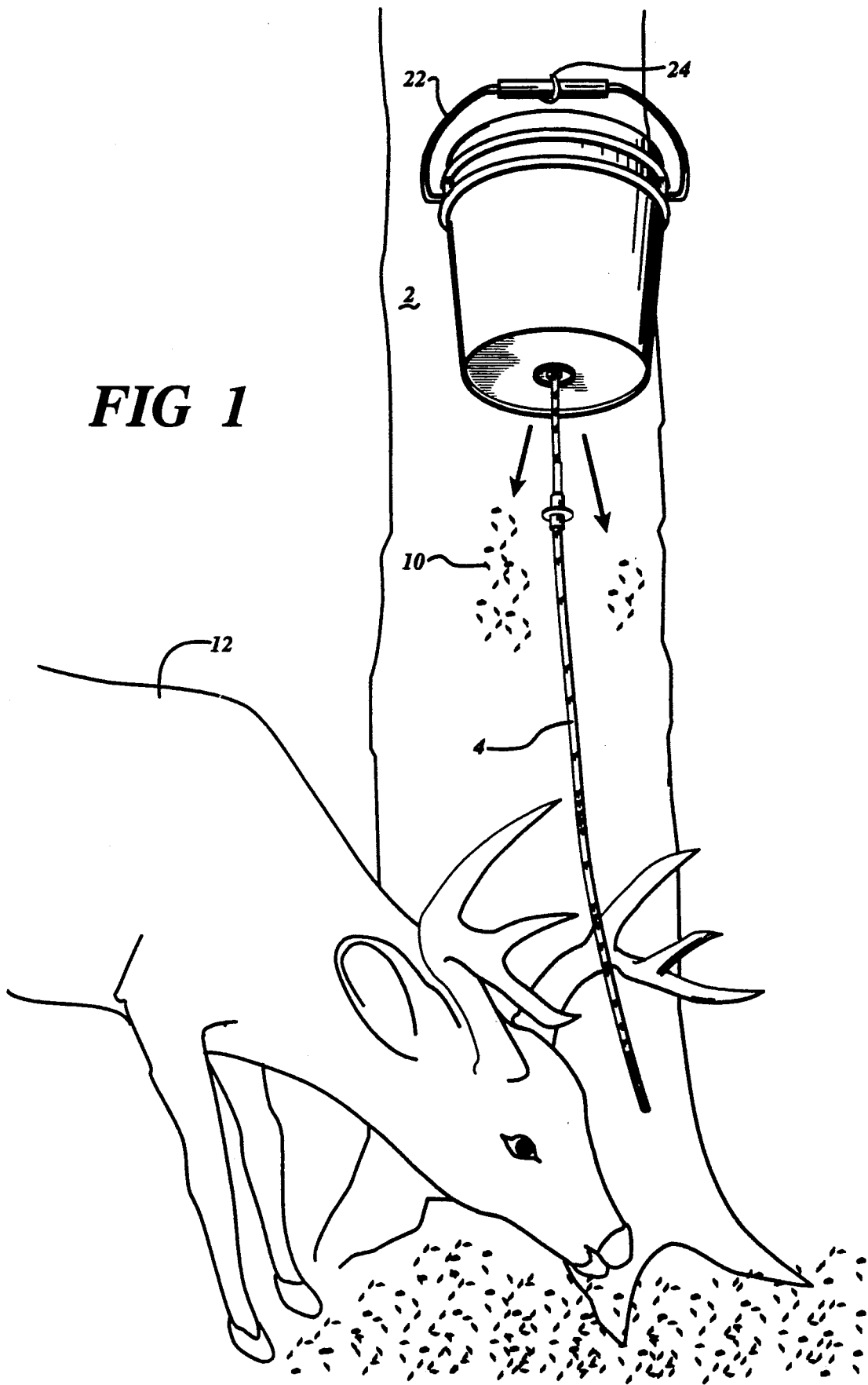
FIG. 1 is an illustration showing the device suspended above the height of a deer which is feeding from the device.

Referring now to the drawings, FIG. 1 discloses the animal feeder device hung from a tree 2. The device could be suspended from any means which will elevate the container to a position above the feeding animal's head. For example, the device could be hung or suspended from a tree branch, gallows, pole or other device. However, in the preferred embodiment, the device will be used to feed deer, and the most common application will be to hang the device from a tree in a yard or in the woods. It is not necessary to hang the device from a branch of suitable height, but rather, the device can be attached directly to a tree, with the feeder rod 4 formed away from the tree to avoid contact with the tree. The lower end of the feeder rod 4 should not contact the ground, and the device will typically be hung or suspended so that the lower 12 end of the feeder rod is approximately eighteen (18") inches above the ground.

The feeder rod 4 extends through an open aperture 6 in the lower portion, or bottom, of the container 8. As the animal contacts the feeder rod, the movement of the feeder rod within the container agitates the feed 10, such as corn, causing an amount of corn to be dispensed through the open aperture to the ground, where it is eaten by the animal. The open aperture must be of sufficient size relative to the feeder rod to allow agitation by the feeder rod upon movement of the feeder rod, and, subject to the operation of the flow adjustment means, of sufficient size to allow feed material to flow through the open aperture.

Figure 2:
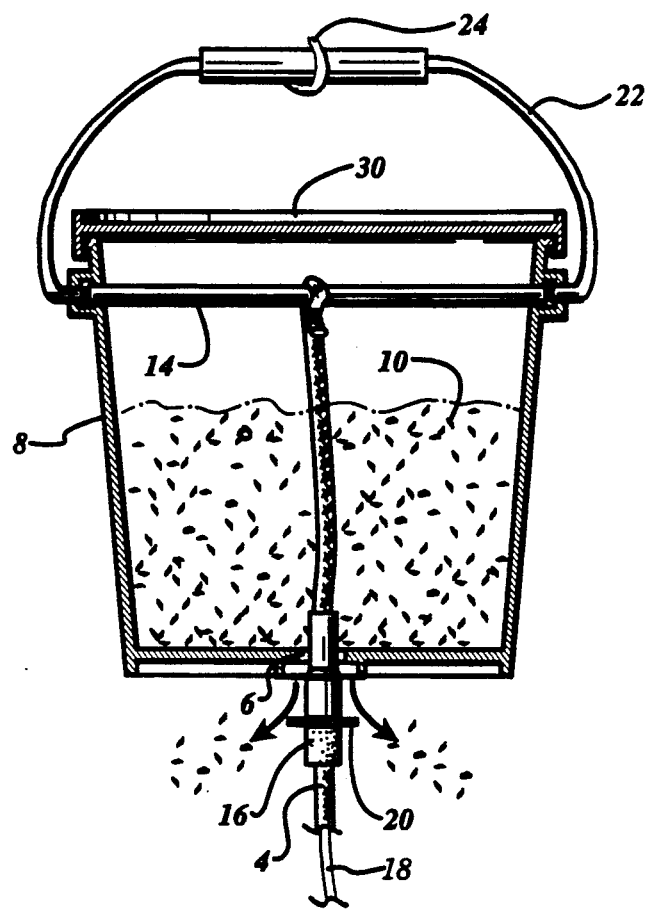
FIG. 2 is a side, sectioned view of the device showing feed being dispensed from the device.

The upper end of the feeder rod is suspended within the container 8, which may be a bucket. FIG. 2. The feeder rod may be suspended from a bar 14 which runs transversely through the container, although the feeder could be suspended in any manner which will allow sufficient movement of the feeder rod within the container to cause proper dispensation of the feed. A lid 30 may be provided for the container. The container may be hung by a handle 22 on a hook 24.

In the preferred embodiment, corn will be the most commonly dispensed feed, although any feed or grain could be dispensed from the device. The irregular shape of corn particularly lends itself to being retained within the container, and will not fall through the open aperture from the container unless the corn receives some amount of agitation by the feeder rod. When the device is static, even with the flow adjustment means moved completely away from and disengaged from the open aperture, corn will not fall from the device. However, when contact is made with the feeder rod, corn will be dispensed through the open aperture, in an amount which is dependent upon the position of the flow adjustment means, as will be seen.

In the preferred embodiment, the open aperture has a step located therein, that is, the open aperture has two diameters, with the lower step comprising the larger of the two apertures.

The flow adjustment means 16 slides along the length of the feeder rod which is external to the container. In the preferred embodiment, the flow adjustment means comprises a collar 20 which, when the collar 20 engages the lower step of the open aperture, prevents the flow of feed material from the device, and at least one step located above the collar, giving the flow adjustment means at least two diameters above the collar, and resulting in three flow settings for the device, exclusive of the "off" setting.

Figure 3:
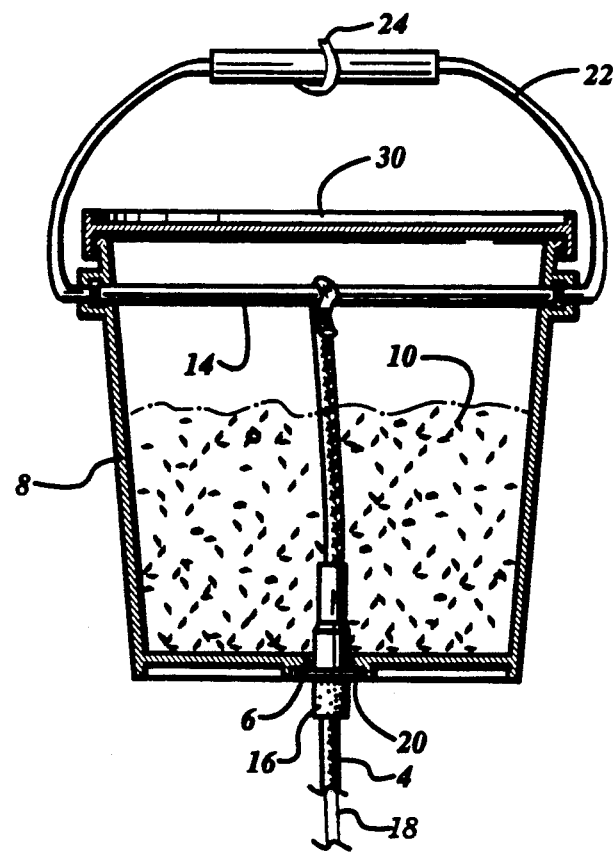
FIG. 3 is a side, sectioned view of FIG. 2, with the flow adjustment means positioned to prevent flow of the feed from the device.

When the flow adjustment means 16 is moved completely away from, and is completely disengaged from the open aperture, maximum dispensation of feed material is achieved. FIG. 2. When the upper, smaller diameter of the flow adjustment means is engaged with the smaller diameter of the open aperture, a "medium" dispensation is achieved. When the larger diameter of the flow adjustment means, which is just above the collar, is engaged with the smaller diameter of the open aperture, while the collar is not engaged with the larger diameter of the open aperture, a minimum flow is achieved, without eliminating flow from the device. When the collar is engaged with the larger diameter of the open aperture, flow is eliminated. FIG. 3. The flow adjustment means could have more than two diameters which engage the open aperture, or could be frustoconical in shape, if desired, to give additional choices with regard to the rate of flow.

In the preferred embodiment, the feeder rod is a braided rope. This braided rope may be made of polypropylene. The braiding of the rope engages the feed material in the container when the device is static to aid in retaining the material within the container, but by the same engagement, causes the corn to be dispensed from the device upon actuation of the feeder rod.

The feeder rod should be semi-rigid, which is defined to be capable of manual formation, but which will allow for shape retention after such formation. This property may be achieved by the insertion of polyethelene tubing through the center of the rope. The feeder rod may then be bent or formed away from the tree so that the feeding animal has clear access to the feeder rod, and the feeder rod does not contact, or come too near, the tree. FIG. 1.

What is claimed is:
1. An animal feeding device, comprising:
   a. a container means having an open aperture in the bottom thereof;
   b. a feeder rod suspended within said container means, and extending through said open aperture of said container means and externally to said container means, wherein contact by an animal with said feeder rod external to said container means causes feed contained within said container means to be agitated and released from said container means through said open aperture; and,
   c. a flow adjustment means which is slidably mounted to said feeder rod having a first diameter which is constant along a portion of a length of said flow adjustment means, the diameter of said flow adjustment means increasing to at least one additional larger diameter which is constant along the length thereof, and having a collar on one end of said flow adjustment means, wherein said flow adjustment means may be slidably positioned along said feeder rod to be disengaged from said open aperture, and progressively slidably positioned upward along said feeder rod to engage said first diameter with said open aperture, then to engage said larger diameter with said open aperture, so that each progressive engagement decreases the flow of feed from said container means, and wherein said flow adjustment means may be slidably positioned to engage said collar within or against said open aperture so as to prevent the flow of feed from said container means.

2. An animal feeding device as described in claim 1, wherein said open aperture comprises a first smaller diameter and a second larger diameter so as to allow said collar to engage said larger diameter to prevent the flow of feed from said container means.

3. An animal feeding device, comprising:
   a. a container means having an open aperture in the bottom thereof;
   b. a feeder rod suspended within said container means, and extending through said open aperture of said container means and externally to said container means, wherein contact by an animal with said feeder rod external to said container means causes feed contained within said container means to be agitated and released from said container means through said open aperture, wherein said feeder rod is a braided material, wherein braids of said material engage said feed to retain said feed within said container means and prevent the flow thereof from said container means when said feeder rods is static, and wherein said braids agitate said feed and cause said feed to flow through said open aperture when contact is made with said feeder rod; and,
   c. a flow adjustment means which is slidably mounted to said feeder rod and which slides upward along said feeder rod so as to contact said container means at said open aperture so as to stop a flow of feed from said container means, and which may be progressively moved downwardly along said feeder rod to incrementally increase a rate of flow of feed from said container means.

4. An animal feeding device, comprising:
   a. a container means having an open aperture in the bottom thereof;
   b. a feeder rod suspended within said container means, and extending through said open aperture of said container means and externally to said container means, wherein contact by an animal with said feeder rod external to said container means causes feed contained within said container means to be agitated and released from said container means through said open aperture, wherein said feeder rod is a rope having tubing inserted through the center thereof which allows said rod to be manually formed to avoid contract of said rod with objects which are present underneath said container when said container is positioned for use, and wherein said feeder rod will retain such position after being so formed; and
   c. a flow adjustment means which is slidably mounted to said feeder rod and which slides upward along said feeder rod so as to contact said container means at said open aperture so as to stop a flow of feed from said container means, and which may be progressively moved downwardly along said feeder rod to incrementally increase a rate of flow of feed from said container means.

* * * * *